United States Patent
Liu et al.

(10) Patent No.: US 12,513,205 B1
(45) Date of Patent: Dec. 30, 2025

(54) SYSTEMS, METHODS, AND PROCESSES FOR BEHAVIOR PREDICTION BASED RECORDING LOCALIZATION

(71) Applicant: Riot Games, Inc., Los Angeles, CA (US)

(72) Inventors: Liu Liu, Los Angeles, CA (US); Raouf Muhamedrahimov, San Diego, CA (US); Thomas F. Bloomfield, Creve Coeur, MO (US); Aneeka Latif, Antioch, CA (US); Kate Elizabeth Grandprey-Shores, Bellevue, WA (US)

(73) Assignee: Riot Games, Inc., Los Angeles, CA (US)

( * ) Notice: Subject to any disclaimer, the term of this patent is extended or adjusted under 35 U.S.C. 154(b) by 0 days.

(21) Appl. No.: 18/434,737

(22) Filed: Feb. 6, 2024

(51) Int. Cl.
| | | |
|---|---|---|
| *H04L 65/70* | (2022.01) | |
| *H04L 65/75* | (2022.01) | |
| *A63F 13/75* | (2014.01) | |
| *A63F 13/87* | (2014.01) | |
| *H04L 65/403* | (2022.01) | |

(52) U.S. Cl.
CPC ............ *H04L 65/70* (2022.05); *H04L 65/75* (2022.05); *A63F 13/75* (2014.09); *A63F 13/87* (2014.09); *H04L 65/403* (2013.01)

(58) Field of Classification Search
CPC ....... H04L 65/70; H04L 65/75; H04L 65/403; A63F 13/75; A63F 13/87
See application file for complete search history.

(56) References Cited

U.S. PATENT DOCUMENTS

| | | |
|---|---|---|
| 5,978,452 A | 11/1999 | Cho |
| 7,379,421 B1 | 5/2008 | Gao et al. |
| 7,961,854 B1 | 6/2011 | Ho et al. |
| 8,366,553 B2 | 2/2013 | Kim et al. |
| 8,700,411 B2 * | 4/2014 | Price ............... G10L 19/018 704/500 |
| 9,120,019 B2 | 9/2015 | Mescon et al. |
| 9,405,741 B1 | 8/2016 | Schaaf et al. |

(Continued)

FOREIGN PATENT DOCUMENTS

| | | |
|---|---|---|
| CN | 103098050 B | 5/2017 |
| CN | 112784016 A | 5/2021 |

(Continued)

OTHER PUBLICATIONS

Non-Final Office Action received for U.S. Appl. No. 18/434,717, mailed on Nov. 13, 2025, 13 pages.

(Continued)

*Primary Examiner* — Oanh Duong
(74) *Attorney, Agent, or Firm* — SHOOK, HARDY & BACON L.L.P.

(57) ABSTRACT

Systems, methods, and media are provided for the localization of the capture and processing of spoken audio based on predictive modeling of future behavior. The spoken audio is detected in a memory buffer associated with transmissions via a voice communication channel of a multi-user session hosting a plurality of user clients. The processing may include downmixing, resampling, compressing, or any combination thereof. Multiple portions of audio data can be combined into an audio data chunk. The chunk of audio data can then be transmitted while the user client is in a non-core state.

19 Claims, 8 Drawing Sheets

(56) References Cited

U.S. PATENT DOCUMENTS

| | | |
|---|---|---|
| 9,533,218 B1 | 1/2017 | Lin |
| 10,922,357 B1 * | 2/2021 | Chennuru ............ G06F 16/2457 |
| 11,023,688 B1 | 6/2021 | Holmdahl et al. |
| 11,065,547 B2 | 7/2021 | Lin et al. |
| 11,405,436 B1 | 8/2022 | Mindlin et al. |
| 11,654,363 B1 | 5/2023 | Rainbolt et al. |
| 11,801,449 B2 * | 10/2023 | Perlman ................ A63F 13/352 |
| 2003/0177008 A1 | 9/2003 | Chang |
| 2005/0037739 A1 | 2/2005 | Zhong |
| 2005/0041786 A1 | 2/2005 | Craig |
| 2007/0032225 A1 | 2/2007 | Konicek et al. |
| 2007/0265073 A1 * | 11/2007 | Novi ....................... A63F 13/54 463/35 |
| 2008/0077517 A1 | 3/2008 | Sappington |
| 2009/0116403 A1 | 5/2009 | Callanan et al. |
| 2009/0170604 A1 | 7/2009 | Mueller et al. |
| 2010/0023336 A1 | 1/2010 | Shmunk |
| 2011/0202355 A1 | 8/2011 | Grill et al. |
| 2011/0300884 A1 | 12/2011 | Ollila et al. |
| 2012/0179982 A1 | 7/2012 | Gandhi et al. |
| 2013/0041655 A1 | 2/2013 | Spears |
| 2013/0151740 A1 * | 6/2013 | Bouknight ............. H04L 47/36 710/56 |
| 2014/0270196 A1 * | 9/2014 | Braho ................... G10L 21/047 381/56 |
| 2015/0005073 A1 | 1/2015 | Cudak et al. |
| 2017/0199934 A1 * | 7/2017 | Nongpiur ............ G06F 16/638 |
| 2017/0225079 A1 | 8/2017 | Conti et al. |
| 2018/0130092 A1 * | 5/2018 | Nahass .................. A63F 13/49 |
| 2020/0098373 A1 | 3/2020 | Fujita et al. |
| 2020/0175972 A1 | 6/2020 | Fan et al. |
| 2020/0236154 A1 | 7/2020 | Ragot et al. |
| 2021/0370183 A1 | 12/2021 | Dorn et al. |
| 2021/0370188 A1 | 12/2021 | Thomas et al. |
| 2022/0032199 A1 | 2/2022 | Rudi et al. |
| 2022/0043938 A1 | 2/2022 | Kochura et al. |
| 2022/0054946 A1 * | 2/2022 | Degarmo ................ A63F 13/77 |
| 2022/0115032 A1 | 4/2022 | Iwagaki et al. |
| 2022/0115033 A1 | 4/2022 | Huffman et al. |
| 2022/0293097 A1 * | 9/2022 | Jekeswaran ............. G06F 3/167 |
| 2022/0392437 A1 | 12/2022 | Moschella |
| 2023/0057442 A1 * | 2/2023 | Stasior .................. G06F 3/0481 |
| 2023/0156569 A1 | 5/2023 | Breaux et al. |
| 2023/0321546 A1 | 10/2023 | Huffman et al. |
| 2023/0381672 A1 * | 11/2023 | Henderson ............ A63F 13/355 |
| 2023/0395065 A1 * | 12/2023 | Huffman ................. G10L 15/08 |
| 2023/0396457 A1 * | 12/2023 | Huffman ............. H04L 12/1822 |
| 2024/0296858 A1 * | 9/2024 | Huffman ................. G06N 3/08 |

FOREIGN PATENT DOCUMENTS

| | | |
|---|---|---|
| CN | 112837677 A | 5/2021 |
| IN | 39/2023 A | 9/2023 |
| JP | 2020-123204 A | 8/2020 |
| KR | 10-2019-0141883 A | 12/2019 |
| KR | 10-2023-0169680 A | 12/2023 |
| WO | 2023/096309 A1 | 6/2023 |

OTHER PUBLICATIONS

Non-Final Office Action received for U.S. Appl. No. 18/434,732, mailed on Nov. 10, 2025, 18 pages.

* cited by examiner

SYSTEMS, METHODS, AND PROCESSES FOR BEHAVIOR PREDICTION BASED RECORDING LOCALIZATION

CROSS-REFERENCE TO RELATED APPLICATIONS

This application is related by subject matter to concurrently filed U.S. patent application Ser. No. 18/434,717 and U.S. patent application Ser. No. 18/434,732, both of which are assigned to the same entity as the present application.

TECHNICAL FIELD

Aspects hereof relate to localizing capture of voice communications based on predictively modeling a user's behavior.

BACKGROUND

Video games provide entertainment, competition, and intellectual stimulation for players. In many multiplayer video games, communication between players is a critical feature of game design and player enjoyment. As such, the development, implementation, and functionality of player communication systems are important. Traditional game communication systems commonly facilitate textual communications (e.g., chatrooms, player mailboxes, and so forth). It is becoming common for video games to enable audio communication systems (e.g., voice chat). Many players use a game's audio communication system to provide game relevant information, coordinate gameplay, form and execute on strategies, build comradery, socialize, make friends, communicate any other piece of information they desire, or any combination thereof. Some players may use a game's audio communication system in ways which disrupt or harm other players or their play experience. For example, some players may harass, offend, threaten, or intimidate other players.

A variety of counteractive measures have been taken to address this disruptive behavior in online gameplay. For instance, games have incorporated muting functions that can be used to mute a player. However, this solution often causes the player(s) being harassed to temporarily lose focus on gameplay while navigating menus to mute the disruptive player. Other attempted solutions include tracking and sharing player reputation while providing players the ability to report disruptive behavior. However, this attempted solution can result in unintended manipulation.

BRIEF SUMMARY

Aspects hereof describe system and methods for the capture, processing, and storage of spoken audio in voice communication channels of a multi-user session (e.g., a multiplayer game with voice chat). The audio data captured within a voice communication channel can be analyzed to determine if the analyzed portion contains spoken audio that was transmitted to other players in the voice communication channel. The portion of audio data can be further processed in some aspects. For example, the portion of audio data may be downmixed, resampled, compressed, or any combination thereof. Multiple portions of audio data can be combined into an audio data chunk. The chunk of audio data can then be transmitted while the user client associated with the voice communication channel is in a non-core state.

In one aspect, non-transitory computer storage media storing executable instructions that when executed by one or more processors cause the one or more processors to perform a method includes detecting initiation of a multi-user session hosting a plurality of clients. Each client may be executed by a disparate user device. The executable instructions may also include analyzing a memory buffer storing a stream of audio data transmitted from the first user's client via the voice communication channel to at least one other client hosted in the multi-user session. The executable instructions may also include tagging a first portion of the stream of audio data as including voice communication. In response to detecting that the first portion of the stream of audio data includes spoken audio, compressing at least the portion of the stream of audio data that includes the tag. The executable instructions may also include compiling a plurality of compressed portions of the stream of audio data into an audio data chunk. The audio data chunk may have a duration less than or equal to 60 seconds. The executable instructions may also include monitoring the first user's client state. In response to a determination that the first user's client state is in a non-core state, the executable instructions may transmit the audio data chunk to a remote server. In response to receiving confirmation from the remote server that the audio data chunk was received, the executable instructions may also clear the memory buffer storing the stream of audio data corresponding to the audio data chunk.

Some aspects are directed to a system that includes a server maintaining a multi-user session, the multi-user session including a voice communication channel for a plurality of clients, where the voice communication channel receives a stream of audio data from a first client and transmits the stream of audio data to at least one other client of the plurality of clients. The system also includes one or more processors and non-transitory computer storage media storing executable instructions that when executed by the one or more processors cause the one or more processors to perform a method. The method includes, receiving a stream of audio data transmitted from the first client via the voice communication channel, analyzing a memory buffer storing the stream of audio data, where in response to detecting that a first portion of the stream of audio data includes spoken audio, the first portion of the stream of audio data is tagged, compiling a plurality of portions of the stream of audio data into a first audio data chunk, the plurality of portions of the stream of audio including the first portion, the first audio data chunk having a duration less than or equal to 60 seconds, detecting termination of the multi-user session, responsive to detecting termination of the multi-user session, compiling a first client audio session by combining a set of audio data chunks, the set of audio data chunks including at least the first audio data chunk, and responsive to compiling the first client audio session, clearing the memory buffer storing the stream of audio data transmitted from the first client.

DESCRIPTION OF THE DRAWINGS

The present invention is described in detail herein with reference to the attached drawing figures, wherein.

DETAILED DESCRIPTION

Figure 1:
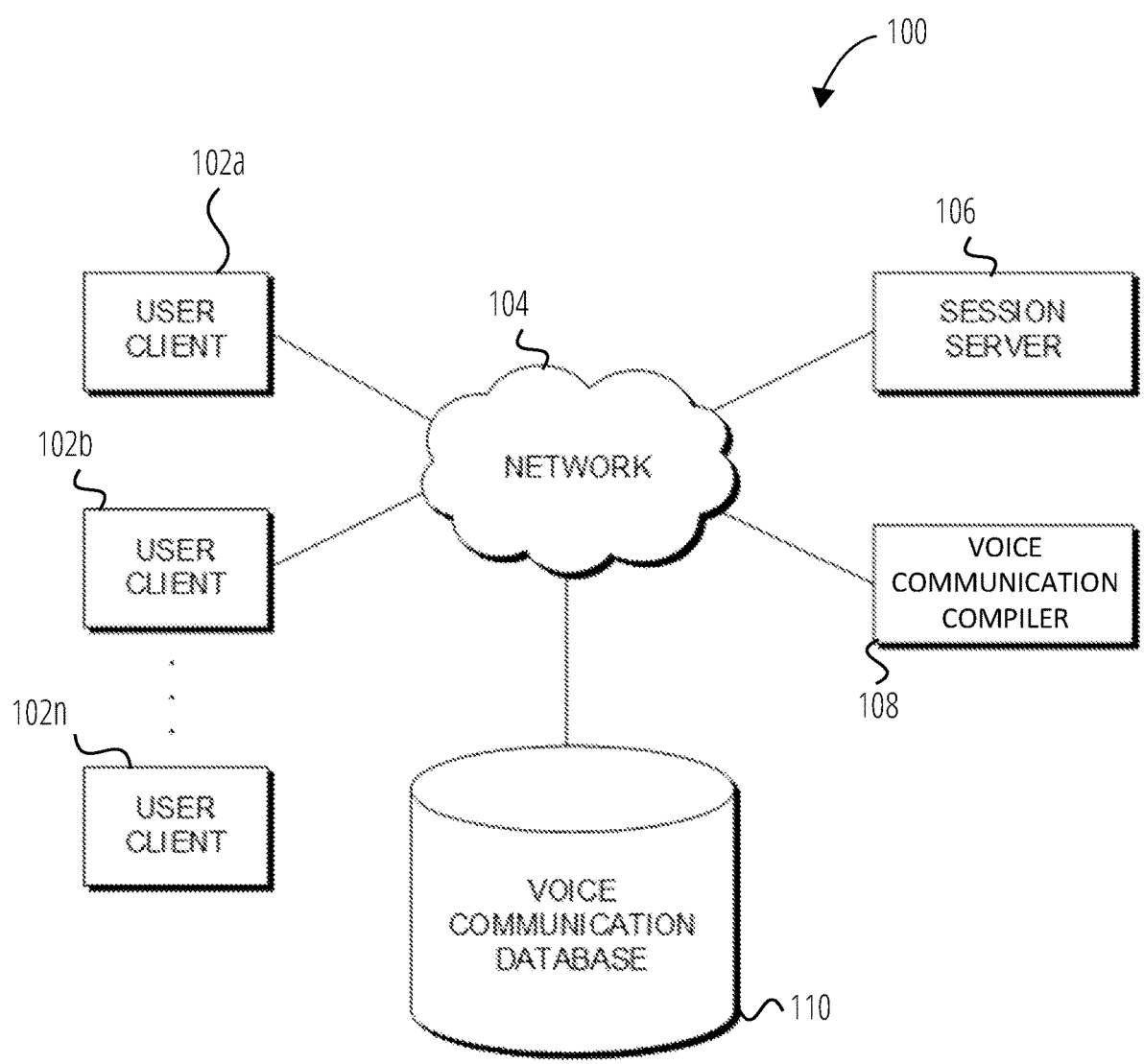
FIG. 1 depicts an example of a multi-device system for voice communications, in accordance with exemplary aspects hereof.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The online multiplayer video gaming industry has gained immense popularity across all demographics around the globe. In many multiplayer video games, communication between players is a critical feature of game design and player enjoyment. Some games enable text-based player communications. However, text-based player communications typically rely on 1) limited or preset text messages, or 2) keyboard (e.g., virtual keyboard or physical keyboard) inputs. Neither of these textual options are ideal for some games. For example, limited or preset communications options may not be flexible enough to accurately communicate information for every situation that a player may encounter during a game. Similarly, players of multiplayer online battle arena (MOBA) games such as Riot's® League of Legends®, first-person shooter (FPS) games such as Riot's® VALORANT®, real-time strategy games, action role-playing games, fighting games, and many other genres of games commonly input commands in excess of 100 commands a minute. These commands may include information gathering, character (e.g., a Champion) movement, character actions (e.g., attacks or skills), and navigation about the game's map. Delaying input of these gameplay commands while typing a message via a keyboard may detrimentally impact player performance.

Additionally, improvements to network bandwidth, computer processing, and battery capacity have dramatically increased the demand for mobile games with the depth and sophistication previously reserved to the traditional gaming systems (e.g., a desktop or laptop). Mobile gaming devices and consoles provide unique challenges for effectively communicating information between players. For example, a significant number of mobile game devices and consoles have a limited set of native player input channels. For example, in many mobile gaming devices the display is coexistent with a touch-based input channel (e.g., a resistance or capacitance touch screen display). A few other physical buttons may exist, but typically those are reserved for device controls (e.g., volume up, volume down, power, and so forth). While console controllers have dedicated input channels, these dedicated input channels are commonly limited in comparison to the common keyboard and mouse input options associated with desktop or laptop systems.

To address the limitations of textual communications, voice communication between players is rapidly becoming integral to the immersive and collaborative nature of multiplayer video games. Players use a game's audio communication system to provide game relevant information, coordinate gameplay, form and execute on strategies, build comradery, socialize, make friends, communicate any other piece of information they desire, or any combination thereof. However, some players may use a game's audio communication system in ways which disrupt, harass, offend, threaten, or harm other players or their play experience. This disruptive behavior can detrimentally impact player well-being and the success and enjoyment of a game.

Attempts have been made to limit the pervasiveness of disruptive voice communications. For example, games have incorporated muting functions that can be used to mute a player. However, this solution often involves the player(s) being harassed to temporarily lose focus on gameplay while navigating menus to mute the disruptive player. Other attempted solutions include tracking and sharing player reputation while providing players the ability to report disruptive behavior. These reports may result in punishment (e.g., a temporary account suspension or a permanent account ban). However, these attempted solutions can result in unintended manipulation. For example, disruptive players may use the reporting system to mass report innocent players, or escape punishment due to a lack of proof of disruptive voice communications. Accordingly, aspects hereof provide systems, methods, and processes for capturing voice communications that are transmitted to other users within a shared environment.

A common hindrance to attempts to limit the pervasiveness of disruptive voice communications is detrimentally influencing game, session, or network performance during a core gameplay moment. As mentioned above, players commonly input commands in excess of 100 commands a minute. Losing focus for even a few seconds, at the wrong moment, while navigating menus could significantly affect the outcome of the game. Similarly, an unexpected drop in a gaming device's (e.g., a computer, mobile device, or console) performance at a critical moment could significantly affect the outcome of the game. Accordingly, some aspects described herein monitor the state of a user client. Where a user client is in a core state, the systems, methods, and processes may hold captured audio data in local memory until the user client is in a non-core state. Where a user client is in a non-core state, the systems, methods, and processes may release captured audio data to a communication component for transmission to a server or a database.

As used herein, the term "memory buffer" refers to memory allocated to hold a specified type of input/output data. Accordingly, a memory buffer includes, but is not limited to, a class of variable or object that is configured to hold the specified type of input/data. For example, in a Java environment, byte buffer is a class of memory buffer that holds integer values that can be called for input/output operations. The term memory buffer also includes, but is not limited to, a set of addressable memory allocated directly or indirectly by a client or software developer kit (SDK) to hold the specified type of input/output data.

Turning now to FIG. 1, a schematic depiction is provided illustrating an example environment 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Generally, environment 100 facilitates and enables multiple users (e.g., players) of a video game to play and communicate in a shared gaming environment. The shared gaming environment can take any form that facilitates at least two users to interact. For example, the shared gaming environment can be a persistent world (such as those of massive multiplayer online role playing games (MMORPG)), a session-based instance in a persistent world (such as a raid, player-versus-player arena, or player-versus-environment arena in an MMORPG), or a session-specific instance of a world (such as a battle royale map, real-time strategy map, first-person shooter (FPS) map, fighting game level, multiplayer online battle arena (MOBA) map, or similar maps). Each player may use a particular device to, among other things, control their character or avatar within the shared environment.

As depicted in FIG. 1, environment 100 includes a plurality of user clients (e.g., user client 102a, user client 102b, and user client 102n), network 104, session server 106, and voice communication compiler 108. A user client (e.g., user client 102a) may be implemented by one or more processors as later described herein. User clients generally facilitate a player's (i.e., user of a device) interaction with a shared gaming environment. For example, the gaming client can display the screen view of the shared gaming environment and the game's user interface. Additionally, the gaming client can convert player input into commands that control the player's character. A device can facilitate this interaction by executing the gaming client to allow a player to join the shared gaming environment. The user client includes operational modules that can utilize a combination of hardware, firmware, and computer executable instructions that facilitate transmission of a user's voice communication to other user clients within the shared gaming environment. For example, the user client includes a software developer's kit (SDK). Amongst other things, the SDK provides the user client with a set of instructions to implement voice chat features, including the efficient management of memory resources for capturing and transmitting audio data. The SDK incorporates a memory buffer allocation component that dynamically allocates and manages memory space dedicated to storing and transmitting voice data. The SDK also includes rules defining core states and non-core states. Those skilled in the art will understand that core states and non-core states will vary by genre (action RPG, first-person shooter, MOBA, fighter, and so forth), game, and game mode. For example, in a first-person shooter, rules defining core states may include determining if the player's character is alive, the player is actively engaged in gameplay, the "buy-phase" is closed, and so forth. Similarly, non-core states may include when the player's character is eliminated, the buy-phase is open, the round of gameplay has not yet begun, similar game states, or any combination thereof. Although depicted in FIG. 1 as distinct components, a user client (e.g., user client 102a, user client 102b, and user client 102n) includes voice communication compiler 108 in at least one embodiment.

The user client may also include operational modules that can utilize a combination of hardware, firmware, and computer executable instructions that facilitate player interaction with a shared gaming environment. The user client may include any number of other gaming elements that facilitate joining the shared gaming environment, such as an account login, matchmaking, character selection, chat, marketplace, and so forth. An illustrative example of such a gaming client includes, but is not limited to, Riot's® VALORANT®.

Network 104 generally facilitates communication between the user clients (e.g., user client 102a, user client 102b, and user client 102n) and session server 106. As such, network 104 can include access points, routers, switches, or other commonly understood network components that provide wired or wireless network connectivity. In other words, network 104 may include multiple networks, or a network of networks, but is depicted in a simple form so as not to obscure aspects of the present disclosure. By way of example, network 104 can include one or more wide area networks (WANs), one or more local area networks (LANs), one or more public networks, such as the Internet, one or more private networks, one or more telecommunications networks, or any combination thereof. Where network 104 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 104 is not described in significant detail herein.

Session server 106 generally facilitates collection and distribution of voice communications transmitted by user clients within a shared gaming environment. Session server 106 may include an initialization module that manages the creation and setup of a voice communication channel for voice chat. For example, the initialization module may define the parameters for the session, including the number of participants, security protocols, and communication channels that define the voice communication channel. In at least one aspect, the voice communication channel is a session-based voice communication channel that is initiated to facilitate voice communication between at least two user clients (e.g., user client 102a and user client 102b). The session server 106 includes operational modules that can utilize a combination of hardware, firmware, and computer executable instructions that facilitate reception and transmission of a user's voice communication to other user clients within the session. Although depicted in FIG. 1 as distinct components, the session server 106 includes voice communication compiler 108 in at least one embodiment.

Additionally, session server 106 may include one or more modules for hosting a multiplayer game for user clients (e.g., user client 102a, user client 102b, and user client 102n). In some embodiments, the session server 106 is coupled, directly or indirectly, to a database for facilitating the storage and querying of records corresponding to a plurality of game play instructions, actions, objects (e.g., virtual game pieces/ characters, weapons, buildings, etc.), maps, settings, or any combination thereof. The database includes, among other things, a relational database or similar storage structure accessible by the server 108. In accordance with embodiments described herein, the database stores a plurality of records that each corresponds to game play instructions, actions, objects, maps, graphic libraries, settings, or any combination thereof.

In some aspects, the session server 106 includes a web server for hosting a website accessible by any of the user clients, a data server for supporting an application of the session server 106, or a combination of both via network 104. The hosted website or data server can support any type of website or application, respectively, including those that facilitate live game play. The session server 106 further processes relationships between the user clients, such as tracking which user clients are associated with a particular team or tracking the actions of each object in a shared gaming environment. In various embodiments, the session server 106 communicates actions commanded via one or more of the user clients (e.g., user clients 102*a*), or at least a portion thereof, to one or more of the other user clients (e.g., user client 102*b* and user client 102*n*). In some aspects session server 106 can be a component of a user client.

Voice communication compiler 108 generally facilitates capturing, analyzing, and storing voice communications transmitted by a user client 102*a* to one or more of the other user clients (e.g., user client 102*b* and user client 102*n*) via a session server 106. The voice communication compiler 108 can use a voice detection component to analyze audio data held in a memory buffer defined by a user client SDK. The voice detection component may use any suitable algorithm to detect voice communications from non-voice communications (e.g., background noise, silence, and so forth). The voice communication compiler 108 also includes mixing and compression components to convert voice communications from a native state to a downmixed and compressed state for storing. Although depicted in FIG. 1 as a distinct component, components of voice communication compiler 108 may be incorporated into a user client (e.g., user client 102*a*), session server 106, or both the user client and session server 106.

Voice communication database 110 includes one or more databases that facilitate selective storage of voice communications transmitted by one or more voice communication compilers (e.g., voice communication compiler 108). The voice communication database 110 may be communicably coupled to one or more user clients (e.g., user client 102*a*, user client 102*b*, and user client 102*n*), session server 106, voice communication compiler 108, or any combination thereof. Some aspects of voice communication database 110 can be communicatively coupled to one or more remote computing devices. After completion of the multi-user session (e.g., a game's match ends) the remote computing device may access the plurality of audio data chunks stored on voice communication database 110. Additionally, or alternatively, while the multi-user session is active, the remote computing device may access the currently captured plurality of audio data chunks stored on voice communication database 110. Said differently, the systems, methods, and processes described herein may be executed in "real-time" (e.g., during the sessions and including temporal delays related to data processing) or after completion of the multi-user session. The computing device may read the metadata tags associated with each audio data chunk. Based on the metadata tags, audio data chunks can be temporally arranged from initiation of the session (e.g., beginning of the match) through the end of the session (e.g., end of the match) or when the user client (e.g., user client 102*a*) leaves the session (e.g., quits the match or otherwise disconnects).

Additionally, the remote computing device can add empty audio data to between gaps in the temporally arranged audio data chunks. Said differently, the audio data chunks containing spoken data for each user client can be reassembled into an audio file that maintains fidelity of the spoken audio and the timing of that spoken audio within the session. In combination with the similarly reconstructed audio of the other user clients associated with the session, audio files can be generated that can be stored for computerized or manual review. For example, in response to a first player (e.g., user client 102*b*) submitting a complaint regarding a second player's (e.g., user client 102*a*) disruptive audio communications in a multiplayer match, the remote computing device may retrieve the audio chunks associated with the second player, the first player, any other player in the match (e.g., user client 102*n*), any combination thereof, or all players in the match. The audio chunks may be reassembled into a reconstructed version of the spoken audio communicated among the user clients.

Figure 2:
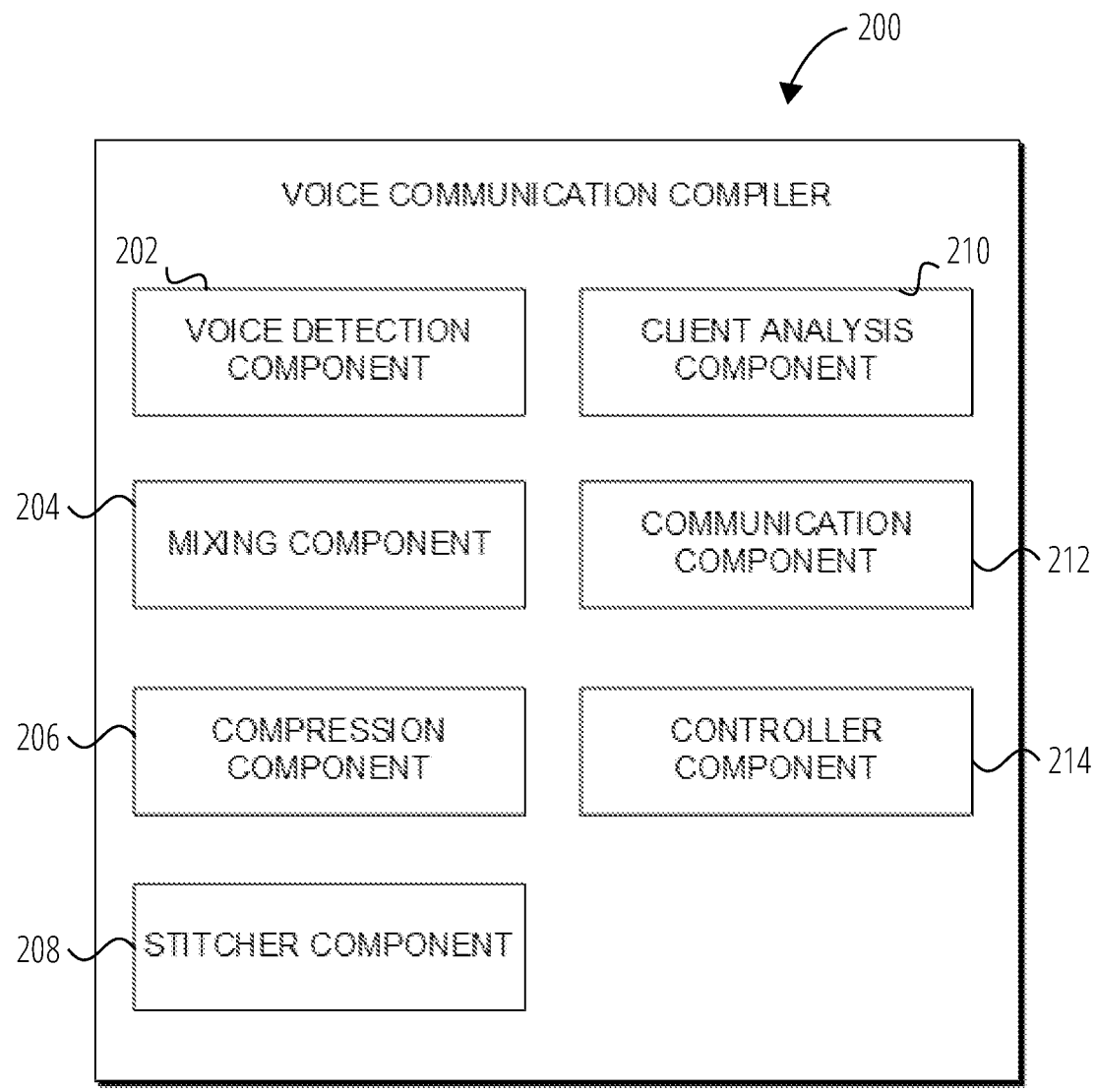
FIG. 2 depicts an aspect of the subject matter, in accordance with exemplary aspects hereof.

Turning to FIG. 2 an example voice communication compiler 200 is depicted in accordance with aspects described herein. Voice communication compiler 200 generally facilitates capturing, analyzing, and storing voice communications transmitted by a user client to one or more of the other user clients via a session server. For example, voice communication compiler 200 may be deployed in environment 100 as one or more voice communication compilers 108. Voice communication compiler 200 includes voice detection component 202, mixing component 204, compression component 206, stitching component 208, client analysis component 210, communication component 212, and control component 214. Various functions described herein as being performed by one or more entities may be carried out by hardware, firmware, and/or software. For instance, various functions may be carried out by a processor executing instructions stored in memory.

Voice detection component 202 includes executable instructions to access a memory buffer storing audio data. For example, voice detection component 202 may be activated by control component 214 in response to detecting initiation of a voice communication channel that directly or indirectly connects user client 102*a* with one or more of user client 102*b* and user client 102*n*. Additionally, voice detection component 202 analyzes the audio data stored in the memory buffer intermittently, periodically, in response to predetermined inputs, or any combination thereof. For example, the voice detection component 202 can analyze a portion of audio data stored in the memory buffer every 10 milliseconds (ms), 20 ms, 30 ms, 40 ms, or 50 ms. Where the analysis of the audio data is determined to contain voice communications, voice detection component 202 may label the analyzed portion of audio data in the memory buffer as including spoken audio (e.g., audible voice communication). For another example, the voice detection component 202 can analyze audio data in response to the decibel level of the audio data received from a microphone connected to an I/O port of a computing device executing the user client 102*a* (e.g., I/O port 510 of FIG. 5).

Generally, mixing component 204 includes executable instructions that facilitate data storage optimization. As those skilled in the art will appreciate, the native capture state may vary based on, among other things, the hardware configuration of the computing device (e.g., computing device 500 of FIG. 5) executing the user client 102*a*, the audio codec used by user client 102*a*, the configuration of the voice communication channel, or a combination thereof. For example, the native capture state may be stereo audio, spatial audio, or mono audio. Accordingly, mixing component 204 downmixes the audio data stored in the memory buffer from a native capture state to single audio channel (e.g., mono channel audio). Mixing component 204 may downmix the audio data from the native capture state to a single channel using any suitable algorithm. For example, where the native capture state is stereo, mixing component 204 may separate each channel of audio data, average the amplitude of each separate channel, align the phase of each channel of audio data, normalize the volume, encode a mono signal of the channels, or any combination thereof.

Additionally, mixing component 204 includes executable instructions that facilitate normalization of the audio data. In particular, mixing component 204 resamples the audio data from the native capture state to a predefined sampling rate. For example, resampling may include determining the native capture sampling rate, calculating a resampling ration, reconstruction of the audio data into the predefined sampling rate. The resampling may also include interpolation or decimation of the audio data based on the difference between the native capture sampling rate and the predefined sampling rate. Interpolation may be used where the predefined sampling rate is higher (i.e., more samples per second) than the native capture sampling rate. Decimation may be used where the predefined sampling rate is lower (i.e., less samples per second) than the native capture sampling rate. The predefined sampling rate can include any suitable sampling rate. In some aspects, the predefined sampling rate is 44.1 kilohertz (kHz), 48 kHz, 96 kHz, or 192 KHz.

Compression component 206 includes executable instructions that facilitate data storage optimization. In particular, compression component 206 includes at least one audio data compression codec. The compression codec can be any codec that is suitable to compress output from mixing component 204 from a native bitrate to a predefined bitrate. The predefined bitrate can be in an inclusive range of 12 kilobits per second (Kb/s) to 320 Kb/s. In some aspects, the predefined bit rate is in an inclusive range of 12 Kb/s to 18 Kb/s. In some aspects, the predefined bit rate is in an inclusive range of 14 Kb/s to 17 Kb/s. In some aspects, the predefined bit rate is in an inclusive range of 15.5 Kb/s to 16.5 Kb/s. In at least one aspect, the predefined bit rate is 16 Kb/s.

Stitching component 208 includes executable instructions that facilitate assembly of audio data chunks. Said differently, stitching component 208 compiles multiple portions of audio data outputs into a chunk of audio data. In some aspects, the multiple portions of audio data that is compiled by stitching component 208 can be output from mixing component 204 or compression component 206. For example, stitching component 208 may assemble an audio data chunk by sequentially ordering a set of audio data portions analyzed by voice detection component 202, downmixed and normalized by mixing component 204, and output from compression component 206.

Additionally, stitching component 208 tags each audio data chunk with metadata related to the particular chunk. A tag may include any data relevant to the portions of audio data included in the audio data chunk. For example, the tag can indicate whether at least one portion of the audio data included in the chunk includes spoken audio. As another example, the tag can indicate how much time has passed since the voice communication channel was initialized, how much time has passed since stitching component 208 assembled an audio data chunk that included spoken audio, or a combination thereof.

Client analysis component 210 monitors the state of user client 102*a*. Where the state of the user client is determined to be a core state, client analysis component 210 holds assembled audio data chunks. Where the state of the user client is determined to a non-core state, client analysis component 210 releases assembled audio data chunks to communication component 212 for transmission to a session server (e.g., session server 106 of FIG. 1) or a voice communication database (e.g., voice communication database 110 of FIG. 1).

Communication component 212 includes executable instructions that facilitate transmission of audio data chunks from the voice communication compiler 200 to a session server or voice communication database. Communication component 212 includes protocols for establishing a data transmission channel with the session server, voice communication database, or both. Communication component 212 may packetize assembled audio data chunks and initiate transmission of the packetized audio data chunks. Additionally, communication component 212 includes protocols for verifying receipt of transmitted audio data chunks. In response to detecting that the transmitted audio data chunk was received, communication component 212 communicates the identity of the transmitted audio data chunk to control component 214.

Control component 214 includes executable instructions that orchestrate the operation of other components of voice communication compiler 200. For example, control component 214 can include rules for the selective activation of voice detection component 202, mixing component 204, compression component 206, stitching component 208, client analysis component 210, communication component 212, or any combination thereof. Additionally, control component 214 includes executable instructions that cause the voice communication compiler 200 to allow the user client 102*a* to clear the memory buffer associated with the transmitted audio data chunk and re-allocate that portion of the memory buffer.

Figure 3:
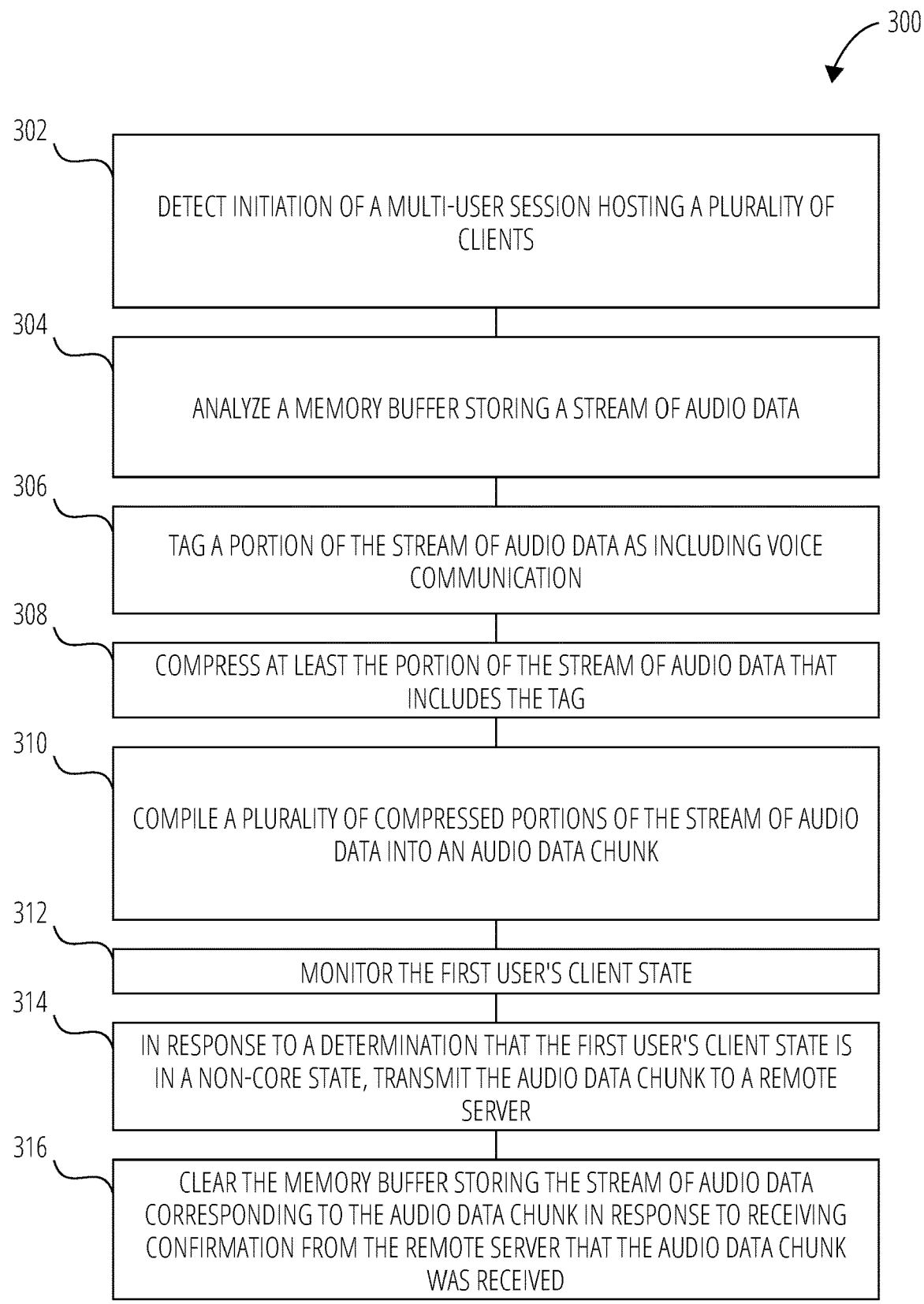
FIG. 3 depicts an example method for capturing voice communications in a multi-user session, in accordance with exemplary aspects hereof.

Now referring to FIG. 3, each block of method 300 can be executed by a computing process that can be performed using any combination of hardware, firmware, software, or any combination thereof. For instance, various functions can be carried out by a processor executing instructions stored in memory. In some aspects, method 300 is carried out by a voice communication compiler (e.g., voice communication compiler 200 of FIG. 2 or voice communication compiler 108 of FIG. 1) associated with a user client. The method can also be embodied as computer-usable instructions stored on computer storage media. The method 300 can be provided by a standalone application, a service or hosted service (standalone or in combination with another hosted service), or a plug-in to another product, to name a few. For example, as described herein, the method 300 is a virtual tool within other software such as a virtual game. In addition, the method 300 is described, by way of example, with respect to FIG. 1 and FIG. 2. However, these methods can additionally or alternatively be executed by any one system, or any combination of systems, including, but not limited to, those described herein.

Generally, method 300 facilitates capturing voice communications that are transmitted to other users within a shared environment. In block 302, method 300 detects initiation of a multi-user session hosting a plurality of clients, the multi-user session including a voice communication channel, wherein the plurality of clients includes a first user's client and wherein each client of the plurality of clients is executed by a desperate user device. Block 302 may be facilitated in part by a session server (e.g., session server 106 of FIG. 1) and a voice communication compiler (e.g., voice communication compiler 200 of FIG. 2). For example, a voice communication compiler 200 may analyze data associated with user client 102a to detect that user client 102a is instantiated in a multi-user voice communication channel hosted by session server 106.

In block 304, method 300 analyzes a memory buffer storing a stream of audio data transmitted from the first user's client via the voice communication channel to at least one other client hosted in the multi-user session. Block 304 may be facilitated in part by voice communication compiler 200 and user client 102a. For example, voice communication compiler 200 may analyze a memory buffer holding audio data associated with user client 102a and the voice communication channel.

In block 306, method 300 tags a first portion of the stream of audio data as including voice communication, in response to detecting that the first portion of the stream of audio data includes spoken audio. Block 306 may be facilitated in part by voice communication compiler 200. For example, a voice detection component 202 may analyze the audio data held in the memory buffer every 30 ms. Where voice detection component 202 determines that the 30 ms portion of audio data includes spoken audio, voice detection component 202 tags the portion of audio data.

In block 308, method 300 compresses at least the portion of the stream of audio data that includes the tag. Some aspects of block 308 include downmixing, resampling, and compression of the audio data. Block 308 may be facilitated in part by voice communication compiler 200. For example, mixing component 204 may downmix the portion of audio data from a native capture state to a single audio channel. Mixing component 204 may also resample the portion of audio data from a native sample rate to a predetermined sample rate. In some aspects, the predefined sampling rate is 44.1 kilohertz (kHz), 48 kHz, 96 kHz, or 192 kHz. Additionally, compression component 206 may compress the downmixed and resampled portion of the audio data from a native bitrate to a predefined bitrate. The predefined bitrate can be in an inclusive range of 12 kilobits per second (Kb/s) to 320 Kb/s. In at least one aspect, the predefined bitrate is 16 Kb/s.

In block 310, method 300 compiles a plurality of compressed portions of the stream of audio data into an audio data chunk. In some aspects, the plurality of compressed portions of the stream of audio including the first portion. Block 310 may be facilitated in part by voice communication compiler 200. For example, stitching component 208 may combine multiple portions of audio data output into a chunk of audio data. The audio data chunk may be created from sequentially ordering a set of audio data portions analyzed by one or more components of voice communication compiler 200. In some aspects, the audio data chunk may be compiled from portions of audio data that do not exceed a predetermined duration. For example, the duration is less than or equal to 60 seconds in at least one aspect.

In block 312, method 300 monitors the first user's client state. Block 312 may be facilitated in part by voice communication compiler 200. For example, client analysis component 210 may monitor the user client (e.g., user client 102a). In block 314, method 300 in response to a determination that the first user's client state is in a non-core state, transmits the audio data chunk to a remote server. Block 314 may be facilitated in part by voice communication compiler 200. For example, at a first time point client analysis component 210 may determine that user client 102a is in a core state. In response, client analysis component 210 may hold the audio data chunk in memory. At a second time point, client analysis component 210 may determine that user client 102a is in a non-core state. Where the state of the user client is determined to be a non-core state, client analysis component 210 may release assembled audio data chunks to a communication component (e.g., communication component 212) for transmission to a session server (e.g., session server 106 of FIG. 1) or a voice communication database (e.g., voice communication database 110 of FIG. 1).

In block 316, method 300 clears the memory buffer storing the stream of audio data corresponding to the audio data chunk. Block 316 may clear the memory buffer in response to receiving confirmation from the remote server that the audio data chunk was received. Block 316 may be facilitated, in part, by voice communication compiler 200. For example, communication component 212 may include protocols for verifying receipt of transmitted audio data chunks. In response to detecting that the transmitted audio data chunk was received, communication component 212 communicates the identity of the transmitted audio data chunk to control component 214. In response, communication component 212 may allow the user client 102a or session server 106 to clear the memory buffer associated with the transmitted audio data chunk and re-allocate that portion of the memory buffer.

Additionally, some aspects of method 300 also include session reconstruction. Session reconstruction may be facilitated, in part, by a session server 106, voice communication database 110, one or more remote computing devices, or a combination thereof. For example, after completion of the multi-user session (e.g., a game's match ends) a computing device or session server may access the plurality of audio data chunks stored on voice communication database 110. The computing device may read the metadata tags associated with each audio data chunk. Based on the metadata tags, audio data chunks can be temporally arranged from initiation of the session (e.g., beginning of the match) through the end of the session (e.g., end of the match) or when the user client (e.g., user client 102a) leaves the session (e.g., quits the match or otherwise disconnects). Additionally, the computing device can add empty audio data to between gaps in the temporally arranged audio data chunks. Said differently, the audio data chunks containing spoken data for each user client can be reassembled into an audio file that maintains fidelity of the spoken audio and the timing of that spoken audio within the session. In combination with the similarly reconstructed audio of the other user clients associated with the session, audio files can be generated that can be stored for computerized or manual review. For example, in response to a first player (e.g., user client 102b) submitting a complaint regarding a second player's (e.g., user client 102a) disruptive audio communications in a multiplayer match, method 300 may retrieve the audio chunks associated with the second player, the first player, any other player in the match (e.g., user client 102n), any combination thereof, or all players in the match.

Figure 4:
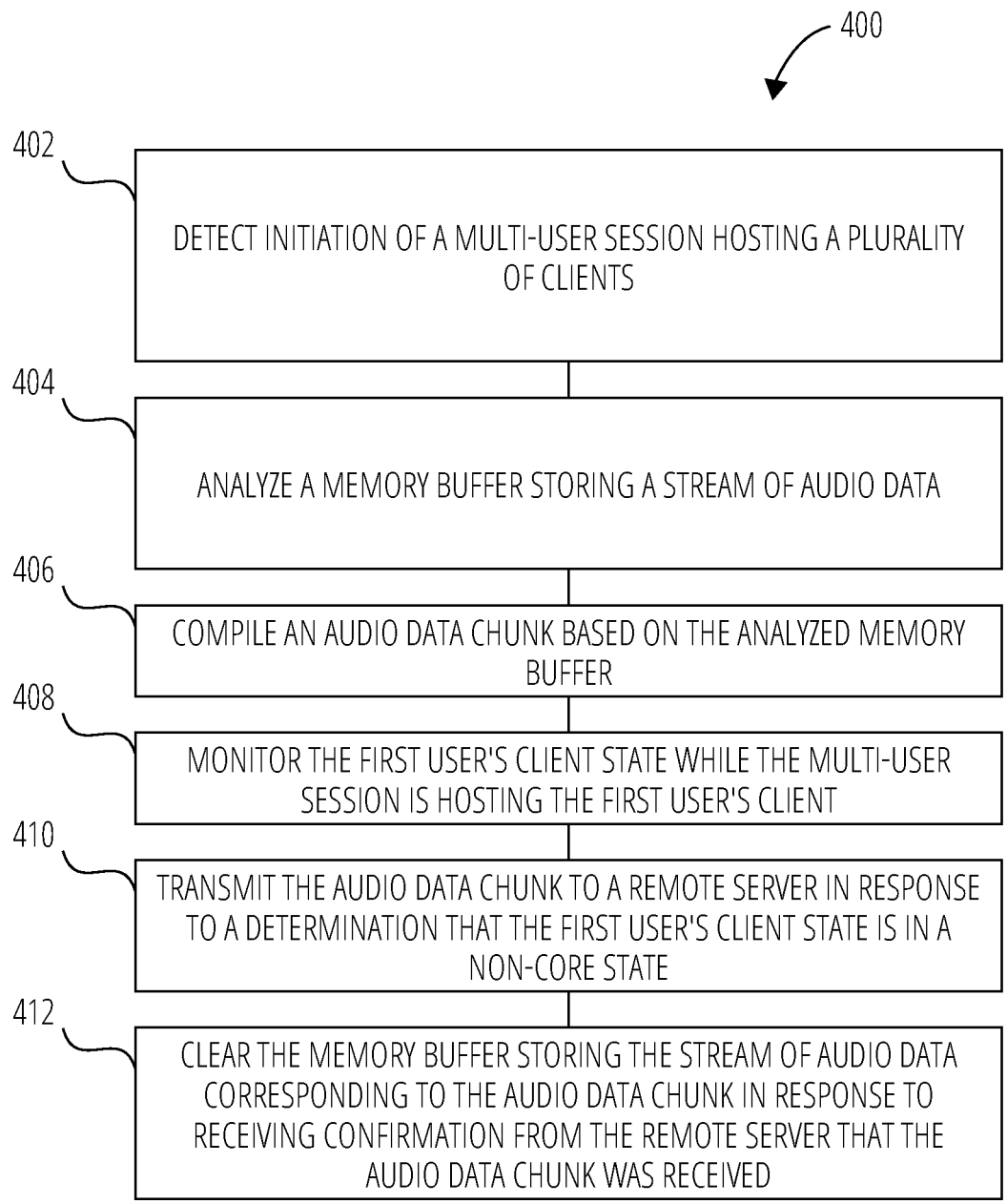
FIG. 4 depicts an example method for capturing voice communications in a multi-user session, in accordance with exemplary aspects hereof.

Now referring to FIG. 4, each block of method 400 can be executed by a computing process that can be performed using any combination of hardware, firmware, software, or any combination thereof. For instance, various functions can be carried out by a processor executing instructions stored in memory. In some aspects, method 400 is carried out by a voice communication compiler (e.g., voice communication compiler 200 of FIG. 2 or voice communication compiler 108 of FIG. 1). The method can also be embodied as computer-usable instructions stored on computer storage media. The method 400 can be provided by a standalone application, a service or hosted service (standalone or in combination with another hosted service), or a plug-in to another product (e.g., user clients 102*a*), to name a few. For example, as described herein, the method 400 is a virtual tool within other software such as a virtual game. In addition, the method 400 is described, by way of example, with respect to the voice communication compiler. However, these methods can additionally or alternatively be executed by any one system, or any combination of systems, including, but not limited to, those described herein.

In block 402, method 400 detects initiation of a multi-user session hosting a plurality of clients, the multi-user session including a voice communication channel. Generally, the multi-user session includes a plurality of clients (e.g., user client 102*a* through user client 102*n* of FIG. 1) each of which is executed by a disparate user device. Block 402 may be facilitated in part by a session server (e.g., session server 106 of FIG. 1) and a voice communication compiler (e.g., voice communication compiler 200 of FIG. 2). For example, a voice communication compiler 200 may analyze data associated with user client 102*a* to detect that user client 102*a* is instantiated in a multi-user session hosted by session server 106.

In block 404, method 400 analyzes a memory buffer storing a stream of audio data transmitted from the first user's client via the voice communication channel to at least one other client hosted in the multi-user session. Block 404 may be facilitated in part by voice communication compiler 200 and user client 102*a*. For example, voice communication compiler 200 may analyze a memory buffer holding audio data associated with user client 102*a* and the voice communication channel.

In block 406, method 400 compiles an audio data chunk based on the analyzed memory buffer. In some aspects, the plurality of compressed portions of the stream of audio including the first portion. Block 406 may be facilitated in part by voice communication compiler 200. For example, stitching component 208 may combine multiple portions of audio data output into a chunk of audio data. The audio data chunk may be created from sequentially ordering a set of audio data portions analyzed by one or more components of voice communication compiler 200. In some aspects, the audio data chunk may be compiled from portions of audio data that do not exceed a predetermined duration. For example, the duration is less than or equal to 60 seconds in at least one aspect. Additionally, block 406 may also include tagging audio data, mixing audio data, compressing audio data, or any combination thereof in some aspects. For example, voice communication compiler 200 may downmix, resample, and compress audio data.

In block 408, method 400 monitors the first user's client state while the multi-user session is hosting the first user's client. Block 408 may be facilitated in part by voice communication compiler 200. For example, client analysis component 210 may monitor the user client (e.g., user client 102*a*). In block 410, method 400 in response to a determination that the first user's client state is in a non-core state, transmits the audio data chunk to a remote server. Block 410 may be facilitated in part by voice communication compiler 200. For example, at a first time point client analysis component 210 may determine that user client 102*a* is in a core state. In response, client analysis component 210 may hold the audio data chunk in memory. At a second time point, client analysis component 210 may determine that user client 102*a* is in a non-core state. Where the state of the user client is determined to be a non-core state, client analysis component 210 may release assembled audio data chunks to a communication component (e.g., communication component 212) for transmission to a session server (e.g., session server 106 of FIG. 1) or a voice communication database (e.g., voice communication database 110 of FIG. 1).

In block 412, method 400 clears the memory buffer storing the stream of audio data corresponding to the audio data chunk. Block 412 may clear the memory buffer in response to receiving confirmation from the remote server that the audio data chunk was received. Block 412 may be facilitated, in part, by voice communication compiler 200. For example, communication component 212 may include protocols for verifying receipt of transmitted audio data chunks. In response to detecting that the transmitted audio data chunk was received, communication component 212 communicates the identity of the transmitted audio data chunk to control component 214. In response, communication component 212 may allow the user client 102*a* or session server 106 to clear the memory buffer associated with the transmitted audio data chunk and re-allocate that portion of the memory buffer.

Figure 5:
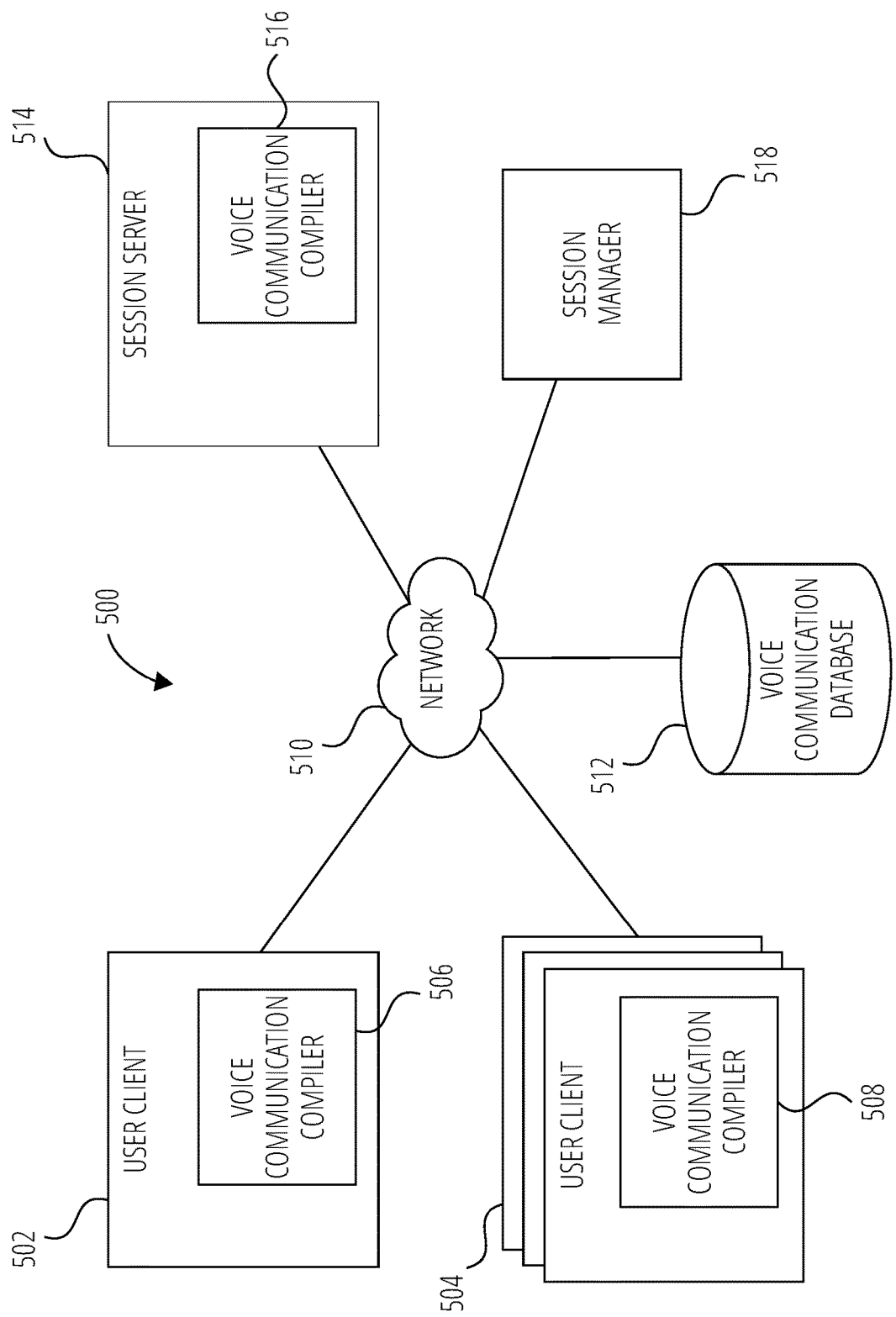
FIG. 5 another example of a multi-device system for voice communications, in accordance with exemplary aspects hereof.

Turning to FIG. 5, an example network deployment environment 500 for capturing, processing, and storing voice communications transmitted by a user client to one or more of the other user clients via a session server is depicted, in accordance with aspects described herein. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Additionally, some aspects of method 400 also include session reconstruction. Session reconstruction may be facilitated, in part, by a session server 106, voice communication database 110, one or more remote computing devices, or a combination thereof. For example, after completion of the multi-user session (e.g., a game's match ends) a computing device or session server may access the plurality of audio data chunks stored on voice communication database 110. The computing device may read the metadata tags associated with each audio data chunk. Based on the metadata tags, audio data chunks can be temporally arranged from initiation of the session (e.g., beginning of the match) through the end of the session (e.g., end of the match) or when the user client (e.g., user client 102*a*) leaves the session (e.g., quits the match or otherwise disconnects). Additionally, the computing device can add empty audio data to between gaps in the temporally arranged audio data chunks. Said differently, the audio data chunks containing spoken data for each user client can be reassembled into an audio file that maintains fidelity of the spoken audio and the timing of that spoken audio within the session. In combination with the similarly reconstructed audio of the other user clients associated with the session, audio files can be generated that can be stored for computerized or manual review. For example, in response to a first player (e.g., user client 102b) submitting a complaint regarding a second player's (e.g., user client 102a) disruptive audio communications in a multiplayer match, method 400 may retrieve the audio chunks associated with the second player, the first player, any other player in the match (e.g., user client 102n), any combination thereof, or all players in the match.

Generally, and similar to environment 100 described in relation to FIG. 1, network deployment 500 facilitates and enables multiple users (e.g., players) of a video game to play and communicate in a shared gaming environment. As depicted in FIG. 5, network deployment 500 includes a plurality of user clients (e.g., user client 502, and user clients 504), network 510, and session server 514. User client 502 and user clients 504 may include some or all of the features of user client 102a described in relation to FIG. 1. Additionally, as depicted in FIG. 5, user client 502 includes a local instance of a voice communication compiler 506. Similarly, each of user clients 504 includes a local instance of voice communication compiler 508. The voice communication compiler 506 and voice communication compiler 508 include some, all, or any combination of the components of voice communication compiler 200 described in relation to FIG. 2. Session server 514 includes some, all, or any combination of the components of session server 106 as described in relation to FIG. 1. In addition, session server 514 includes a locally hosted voice communication compiler 516, which includes some, all, or any combination of the components of voice communication compiler 200 described in relation to FIG. 2. Network deployment 500 includes voice communication database 512. In some embodiments, voice communication database 512 may be voice communication database 110.

Additionally, network deployment 500 includes session manager 518. Generally, session manager 518 facilitates the determination of the localization of capturing and processing of spoken audio data transmitted by a user client to one or more of the other clients in the common session. Said another way, session manager 518 provides commands to session server 514 instructing session server 514 to activate the local voice communication compiler 516 or instructing 514 to activate the voice communication compiler of one or more user clients.

The determination of which voice communication compiler is activated can be based on a number of factors depending on the user client, the session server, the voice communication compiler, past player behavior, or any combination thereof. For example, session manager 518 may include one or more models that generate a prediction of future player behavior based on the player's historical behavior. The model can be any model suitable for outputting prediction values. For example, the model may be a logistic regression model, decision tree model, support vector machine model, random forest model, extreme gradient boosting (XGBoost) model, neural network, any similar machine learning model, or any combination thereof.

Figure 6:
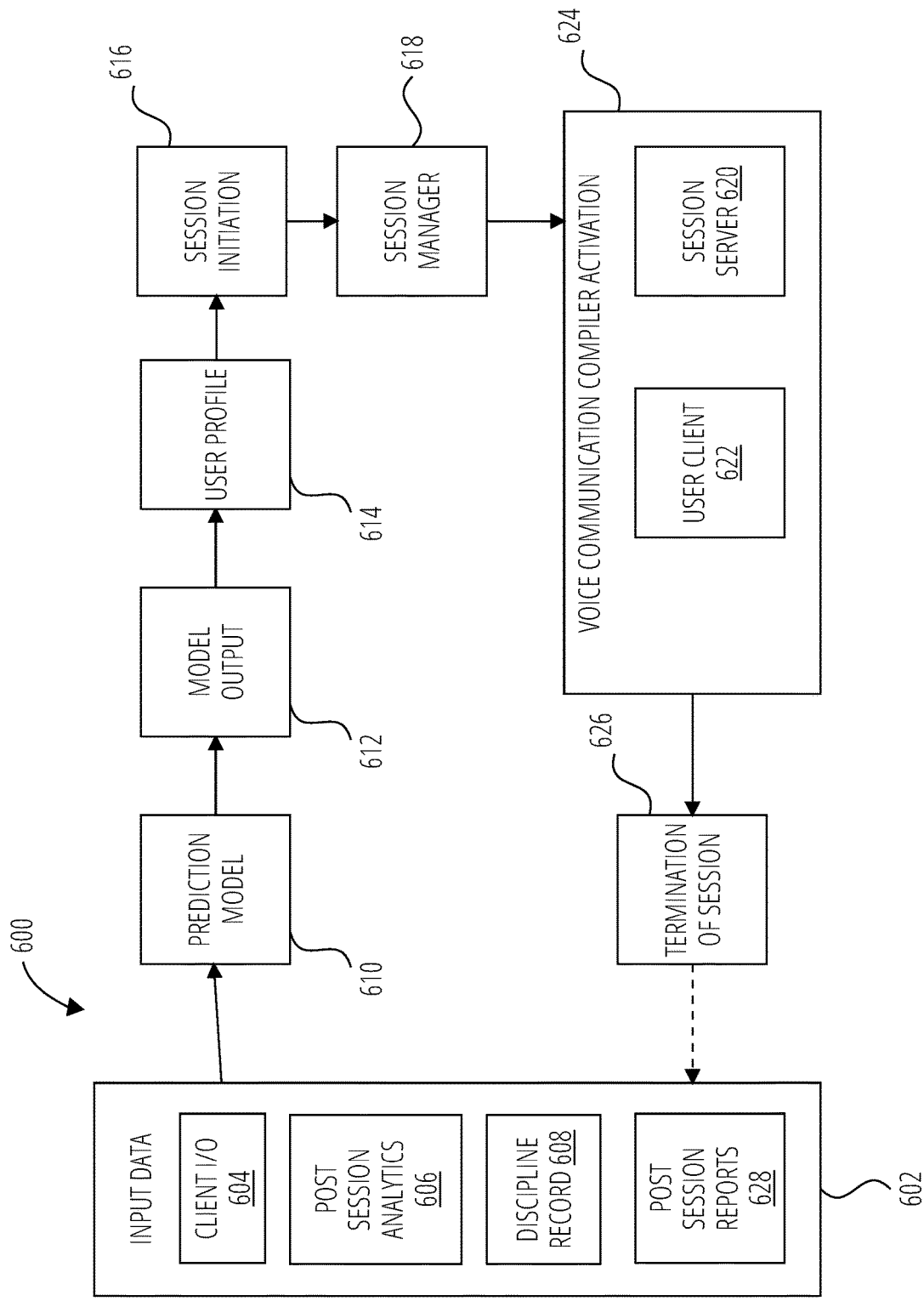
FIG. 6 depicts an example process for model based user behavior prediction, in accordance with exemplary aspects hereof.

Turning now to FIG. 6 and with continued reference to FIG. 5, a process 600 is depicted for generating an actionable prediction of future player behavior based on a set of input data. Generally, the output prediction may be associated with a predicted user (e.g., player) account. When a user client initiates a request to join a session (e.g., entering match making) and the session is initiated, a session manager (e.g., session manager 518) identifies the user account that corresponds to the user client (e.g., user client 502). The session manager may access a prediction of future behavior associated with the user account. The session manager transmits a command to the session server hosting the session. Where the prediction of future behavior exceeds a predefined threshold, the command causes, amongst other things, the session server to activate a server executed (i.e., executed by the session server or another server associated with the session server) voice communication compiler and assign the locally executed voice communication compiler to capture voice communications transmitted by the user client corresponding to the user account. Alternatively, where the prediction of future behavior is less than or equal to the predefined threshold, the command causes, amongst other things, the session server to activate a voice communication compiler associated with the user client. Accordingly, process 600 may be implemented to generate actionable prediction of future player behavior based on a set of input data.

In particular, process 600 may include generating and/or receiving input data 602 for a specific user account. The input data 602 may be received, as a non-limiting example, from one or more databases, one or modules of a session server that hosts sessions. The input data 602 may include, without limitation, Client I/O 604 (e.g., key strokes, mouse movement, mouse clicks, metadata related to any I/O, and so forth), post session analytics 606 (e.g., kills, assists, deaths, same team-kills, same team damage dealt, metadata related to any analytics, and so forth), and discipline record 608 (e.g., previously issued temporary bans, previously issued temporary textual communication bans, previously issued temporary voice communication bans, and so forth). Additionally, in some aspects, input data 602 includes post session reports 628. Post session reports 628 can include, amongst other things, reports of cheating, text extracted from a user comments portion of a report of cheating, reports of intentionally killing or damaging teammates, text extracted from a user comments portion of a report of intentionally killing or damaging teammates, reports of disruptive communication, text extracted from a user comments portion of a report of disruptive communication, report of an offensive or inappropriate user account name (e.g., gamer tag, handle, or callsign), text extracted from a user comments portion of a report for an offensive or inappropriate user account name, report of leaving the game early or being away from keyboard (also referred to as "AFK"), text extracted from a user comments portion of a report for leaving the game early or being AFK, reports of disrespectful behavior, text extracted from a user comments portion of a report for disrespectful behavior, reports of threatening behavior, text extracted from a user comments portion of a report for threatening behavior, or any combination thereof. As another example, the input data 602 may include virtual data generated to facilitate testing and training a prediction model, such as prediction model 610.

Input data 602 may be provided as input to a prediction model 610, in some aspects of process 600. The prediction model 610 may be any model suitable for outputting prediction values. For example, the model may be a logistic regression model, decision tree model, support vector machine model, random forest model, extreme gradient boosting (XGBoost) model, neural network, any similar machine learning model, or any combination thereof. The prediction model 610 ingests the input data 602 and generates model output 612. Model output 612 includes a value representative of a prediction of future behavior. The value may be a numerical representation of the likelihood that the specific user account will engage in disruptive behavior.

Model output 612 may be associated with a user profile 614 associated with the specified user account. Additionally, or alternatively, model output 612 may be compared to a threshold value. In some embodiments, the threshold value is a predefined value. In some embodiments, the threshold value is predetermined but variable value. Said differently, the threshold value may be determined by one or more rules. The rules are customizable based on any number of factors. For example, the threshold value may be partially based on the hardware configuration of the session server. Said differently, the threshold value may be dynamically adjusted based on currently available server resources. Similarly, the threshold value may be partially based on the hardware configuration of the user device executing the user client.

At some point in time after user profile 614 is associated with model output 612, the user client 502 may request initiation of a session. In some embodiments, the session initiation 616 includes a handshaking protocol with session server 514 that identifies the user account associated with user client 502. Session server 514 can provide session manager 618 the details of the user account associated with user client 502. Session manager 618 can access the user profile associated with the account and determine which voice communication compiler (e.g., voice communication compiler 506 or voice communication compiler 516) should be activated.

Input data 602 may be provided as input to a prediction model 610, in some aspects of process 600. The prediction model 610 may be any model suitable for outputting prediction values. For example, the model may be a logistic regression model, decision tree model, support vector machine model, random forest model, extreme gradient boosting (XGBoost) model, neural network, any similar machine learning model, or any combination thereof. The prediction model 610 ingests the input data 602 and generates model output 612. Model output 612 includes a value representative of a prediction of future behavior. The value may be a numerical representation of the likelihood that the specific user account will engage in disruptive behavior. Model output 612 may be associated with a user profile 614 associated with the specified user account. Additionally, or alternatively, model output 612 may be compared to a threshold value. In some embodiments, the threshold value is a predefined value. In some embodiments, the threshold value is predetermined but variable value. Said differently, the threshold value may be determined by one or more rules. The rules are customizable based on any number of factors. For example, the threshold value may be partially based on the hardware configuration of the session server. Said differently, the threshold value may be dynamically adjusted based on currently available server resources. Similarly, the threshold value may be partially based on the hardware configuration of the user device executing the user client.

At some point in time after user profile 614 is associated with model output 612, the user client 502 may request initiation of a session. In some embodiments, the session initiation 616 includes a handshaking protocol with session server 514 that identifies the user account associated with user client 502. Session server 514 can provide session manager 618 the details of the user account associated with user client 502. Session manager 618 can access the user profile associated with the account and determine which voice communication compiler (e.g., voice communication compiler 506 or voice communication compiler 516) should be activated.

In some embodiments, session manager 618 transmits a command 624 to user client 622 or session server 620 to activate the corresponding voice communication compiler. For example, session manager 618 can transmit a command to session server 620 where the session manager 618 determines that the model output 612 for the user account corresponding to user client 502 exceeds the threshold value. Similarly, session manager 518 can transmit a command to user client 502 where the session manager 518 determines that the model output for the user account corresponding to user client 502 is less than or equal to the threshold value. Session manager 518 may execute similar decision-making authority for each of the user accounts associated with user clients 504.

Alternatively, in some embodiments, session manager 618 transmits the command 624 to session server 620 with instructions for session server 620 to activate either the voice communication compiler 622 or voice communication compiler 620 for the account associated with the user client. For example, session manager 518 can transmit a command to session server 514 with instructions to initiate the voice communication compiler 516 where session manager 518 determines that the model output for the user account corresponding to user client 502 exceeds the threshold value. Similarly, session manager 518 can transmit a command to session server 514 to activate voice communication compiler 506 where the session manager 518 determines that the model output for the user account corresponding to user client 502 is less than or equal to the threshold value. Session manager 518 may execute similar decision-making authority for each of the user accounts associated with user clients 504.

After termination of session 626 is detected, the input data 602 may be updated for each user account associated with the user clients that were part of the session. In some embodiments, the input data 602 may be updated periodically, intermittently, or continuously. For example, in at least one embodiment, the input data 602 for a user client is updated with data every twenty-four (24) hours. Additionally, data may be removed from input data 602. For example, the input data 602 may contain data for a user client over a rolling time window. In some embodiments, the rolling time window is four (4) days, five (5) days, six (6) days, seven (7) days, eight (8) days, nine (9) days, ten (10) days, eleven (11) days, twelve (12) days, thirteen (13) days, fourteen (14) days, fifteen (15) days, sixteen (16) days, seventeen (17) days, eighteen (18) days, nineteen (19) days, twenty (20) days, or any other suitable duration.

Figure 7:
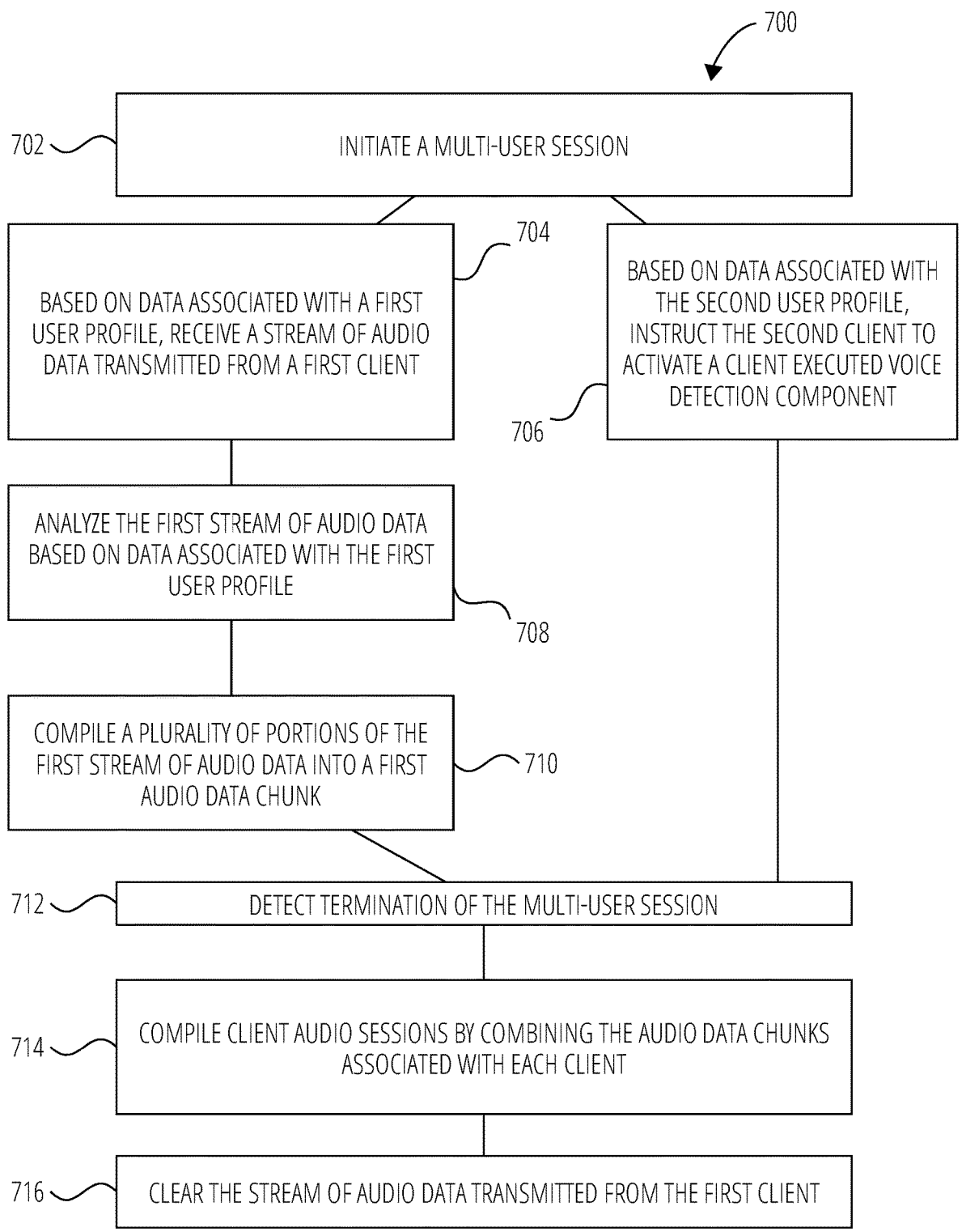
FIG. 7 depicts an example method for determining the localization of capturing voice communications based on model derived user behavior predictions, in accordance with one embodiment.

Now referring to FIG. 7, each block of method 700 can be executed by a computing process that can be performed using any combination of hardware, firmware, software, or any combination thereof. For instance, various functions can be carried out by a processor executing instructions stored in memory. In some aspects, method 700 is carried out by one or more components of network deployment 500 of FIG. 5. The method 700 can be facilitated by a standalone application, a service or hosted service (standalone or in combination with another hosted service), or a plug-in to another product, to name a few. For example, as described herein, the method 700 is a virtual tool within other software such as a virtual game. In addition, the method 700 is described, by way of example, with respect to a voice communication compiler. However, these methods can additionally or alternatively be executed by any one system, or any combination of systems, including, but not limited to, those described herein.

In block 702, method 700 initiates a multi-user session. The multi-user session includes a voice communication channel for a plurality of clients. In some aspects, the initiation includes identifying a first user profile associated with a first client. For example, session server 514 may initiate a multi-user session including user client 502 and user clients 504.

Some aspects of method 700 may also include identifying a user account associated with each of the plurality of clients included in the multi-user session. For example, in some aspects, session server 514 handshakes with user client 502 and user client 504. During the handshake, user client 502 may provide identification of the user account associated with the user client 502. Similarly, each of the plurality of user clients 504 may identify their associated user account. Session server 514 can provide session manager 518 the details of the user account associated with each of the user clients. Session manager 518 accesses a user profile for each of the user accounts and determines which voice communication compiler (e.g., voice communication compiler 506 or voice communication compiler 516) should be activated.

In block 704, method 700 receives a first stream of audio data transmitted from the first client via the voice communication channel. Block 704 may be initiated in some aspects, in response to a determination by a session manager 518 that user client 502 is associated to a user account that has a prediction of future behavior that exceeds a predetermined threshold. The prediction of future behavior may be determined by a prediction model such as described in relation to process 600 of FIG. 6. For such a user client, session manager 518 transmits a command to session server 514 to activate voice communication compiler 516 and task it to capture voice communications transmitted by user client 502.

In block 706, method 700 instructs the second client to activate a client executed voice detection component based on data associated with the second user profile. Block 704 may be initiated in some aspects, in response to a determination by a session manager 518 that user clients 504 is associated to a user account that has a prediction of future behavior that is equal to or less than a predetermined threshold. The prediction of future behavior may be determined by a prediction model such as described in relation to process 600 of FIG. 6. For such a user client, session manager 518 transmits a command to session server 514 to activate each voice communication compiler 508 and task it to capture voice communications transmitted by user client 504.

In block 708, method 700 based on data associated with the first user profile (e.g., user client 502), analyzes the first stream of audio data. In response to detecting that a first portion of the first stream of audio data includes spoken audio, the first portion of the first stream of audio data is tagged. Block 708 may be facilitated by any suitable audio data analysis protocol. For example, in some aspects, block 708 may be facilitated by method 300 of FIG. 3 or routine 400 of FIG. 4.

In block 710, method 700 compiles a plurality of portions of the first stream of audio data into a first audio data chunk, the plurality of portions of the first stream of audio including the first portion, the first audio data chunk having a duration less than or equal to 60 seconds. Block 708 may be facilitated by any suitable audio data analysis protocol. For example, in some aspects, block 708 may be facilitated by method 300 of FIG. 3 or routine 400 of FIG. 4.

In block 712, method 700 detects termination of the multi-user session. Termination of the multi-user session may be facilitated by any suitable means. In block 714, method 700 compiles a first client (e.g., user client 502) audio session by combining the audio data chunks associated with the first client captured during the multi-user session. For example, reconstruction of the session for user client 502 may be facilitated, in part, by a session server 514, voice communication database 512, one or more remote computing devices, or a combination thereof. For another example, after completion of the multi-user session (e.g., a game's match ends) a computing device or session server 514 may access the plurality of audio data chunks stored on voice communication database 512 associated with user client 502. The computing device may read the metadata tags associated with each audio data chunk. Based on the metadata tags, audio data chunks can be temporally arranged from initiation of the session (e.g., beginning of the match) through the end of the session (e.g., end of the match) or when the user client (e.g., user client 502) leaves the session (e.g., quits the match or otherwise disconnects). Additionally, the computing device can add empty audio data to between gaps in the temporally arranged audio data chunks. Said differently, the audio data chunks containing spoken data for each user client can be reassembled into an audio file that maintains fidelity of the spoken audio and the timing of that spoken audio within the session. In combination with the similarly reconstructed audio of the other user clients associated with the session, audio files can be generated that can be stored for computerized or manual review. For example, block 712 may retrieve the audio chunks associated with a first player, a second player, any other player in the match (e.g., user client 102*n*), any combination thereof, or all players in the match in response to the second players (e.g., any user client of user clients 504) submitting a complaint regarding the first player's (e.g., user client 502) disruptive audio communications in a multiplayer match. One skilled in the art will understand that the first player in the preceding example may be associated with one of the user clients 504 and the second player may be associated with one of the user clients 504.

In block 716, session server 514 clears the stream of audio data transmitted from user client 502 in response to the reconstruction of the audio session. Alternatively, block 716 may clear the stream of audio data after a predetermined period has passed without a request for evaluation for disruptive behavior. Session server 514 may facilitate block 716, in part.

Figure 8:
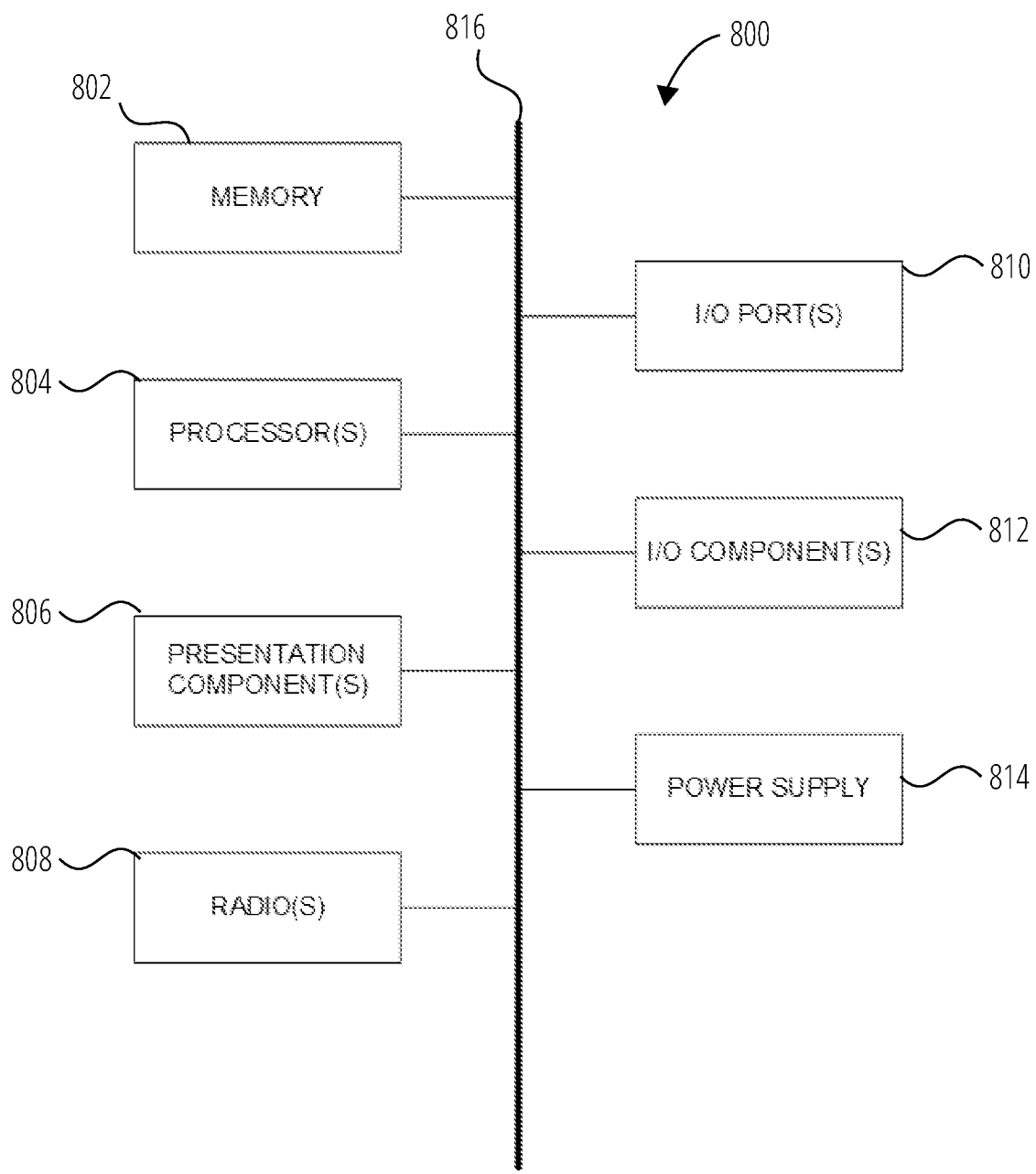
FIG. 8 depicts an example computing device, in accordance with aspects hereof.

Having described embodiments of the present disclosure, an exemplary operating environment in which embodiments of the present disclosure may be implemented is described below in order to provide a general context for various aspects of the present disclosure. Referring initially to FIG. 8 in particular, an exemplary operating environment for implementing embodiments of the present disclosure is shown and designated generally as computing device 500. Computing device 800 is but one example of a suitable computing environment and is not intended to suggest any limitation as to the scope of use or functionality of the disclosed embodiments. Neither should the computing device 800 be interpreted as having any dependency or requirement relating to any one or combination of components illustrated.

The embodiments herein may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The described embodiments may be practiced in a variety of system configurations, including hand-held devices, consumer electronics, general-purpose computers, more specialty computing devices, etc. The described embodiments may also be practiced in distributed computing environments where tasks are performed by remote-processing devices that are linked through a communications network.

With reference to FIG. 8, computing device 800 includes a bus 816 that directly or indirectly couples the following devices: memory 802, one or more processors 804, one or more presentation components 806, input/output (I/O) ports 810, input/output components 812, and an illustrative power supply 814. Bus 816 represents what may be one or more buses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. In addition, processors have memory. The inventor recognizes that such is the nature of the art, and reiterates that the diagram of FIG. 8 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise transitory signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 802 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 802 or I/O components 812. Presentation component(s) 806 present data indications to a user or other device. Exemplary presentation components include a display device, speaker, printing component, vibrating component, etc.

I/O ports 810 allow computing device 800 to be logically coupled to other devices including I/O components 812, some of which may be built in. Illustrative components include a microphone, joystick, game pad, satellite dish, scanner, printer, wireless device, etc. The I/O components 812 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radios 808 (or similar wireless communication components). The radio 808 transmits and receives radio or wireless communications. The computing device 800 may be a wireless terminal adapted to receive communications and media over various wireless networks. Computing device 800 may communicate via wireless protocols, such as long-term evolution ("LTE"), code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth® connection to another computing device is a second example of a short-range connection, or a near-field communication connection. A long-range connection may include a connection using, by way of example and not limitation, one or more of CDMA, LTE, GPRS, GSM, TDMA, and 802.16 protocols.

As can be understood, embodiments of the present disclosure provide for, among other things, systems and methods for anti-cheat detection. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that embodiments of the present disclosure are one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. A system comprising:
   a session server including one or more processors;
   non-transitory computer storage media storing executable instructions that when executed by the one or more processors cause the one or more processors to perform a method comprising:
   initiating a multi-user session including a voice communication channel for a plurality of clients, wherein the initiating includes identifying a first user profile associated with a first client;
   receiving a stream of audio data transmitted from the first client via the voice communication channel;
   analyzing a memory buffer storing the stream of audio data to tag a plurality of portions of the stream of audio data including spoken audio;
   stitching together in sequence the plurality of tagged portions of the stream of audio data into a first audio data chunk based on metadata included in the tags;
   detecting termination of the multi-user session;
   based on the termination of the multi-user session, reconstructing a first client audio session by combining a set of audio data chunks in sequence; and
   clearing the memory buffer storing the stream of audio data transmitted from the first client.

2. The system of claim 1, wherein the method further comprises:
   providing a set of input data associated with the first user profile to a predictive model;
   comparing output of the predictive model to a threshold;
   in response to the output of the predictive model exceeding the threshold; and
   modifying the first user profile to include instructions that trigger the session server to capture the stream of audio data transmitted from the first client via the voice communication channel.

3. The system of claim 2, wherein based on at least termination of the multi-user session, the set of input data associated with the first user profile is updated.

4. The system of claim 3, wherein the first user profile is updated based on passage of a predetermined period.

5. The system of claim 1, wherein initiating the multi-user session including a voice communication channel for a plurality of client includes identifying a second user profile associate with a second client;
   based on data associated with the second user profile, instructing the second client to activate a client executed voice detection component.

6. The system of claim 5, further comprising receiving an audio data chunk from the second client based on the second client being instructed to activate the client executed voice detection component.

7. The system of claim 1, wherein the memory buffer is analyzed based on data associated with the first user profile.

8. The system of claim 1, wherein, the first audio data chunk has a duration less than or equal to 60 seconds.

9. The system of claim 1, wherein the first client audio session is compiled responsive to detecting termination of the multi-user session.

10. The system of claim 1, wherein stitching together in sequence the plurality of tagged portions of the stream of audio data into an audio data chunk method includes:
    determining an elapsed duration for the audio data chunk, the elapsed duration defining a period of elapsed time between initiation of the multi-user session and generation of the portion of the first user's voice communication channel.

11. The system of claim 1, wherein the memory buffer is cleared responsive to compiling the first client audio session.

12. Non-transitory computer storage media storing executable instructions that when executed by one or more processors cause the one or more processors to perform a method comprising:
    initiating a multi-user session including a voice communication channel for a plurality of client, wherein the initiating includes identifying a first user profile associated with a first client;
    receiving a first stream of audio data transmitted from the first client via the voice communication channel;
    analyzing the first stream of audio data to tag a plurality of portions of the stream of audio data including spoken audio;
    stitching together in sequence the plurality of tagged portions of the first stream of audio data into a first audio data chunk based on metadata included in the tags;
    detecting termination of the multi-user session;
    based on the termination of the multi-user session, reconstructing a first client audio session by combining a first set of audio data chunks, the first set of audio data chunks including at least the first audio data chunk; and
    clearing the stream of audio data transmitted from the first client.

13. The non-transitory computer storage media of claim 12, wherein the method further comprises:
    providing a set of input data associated with the first user profile to a predictive model;
    comparing output of the predictive model to a threshold;
    in response to the output of the predictive model exceeding the threshold; and modifying the first user profile to include instructions that trigger the session server to capture the stream of audio data transmitted from the first client via the voice communication channel.

14. The non-transitory computer storage media of claim 12, wherein initiating the multi-user session including a voice communication channel for a plurality of client includes identifying a second user profile associate with a second client;
    based on data associated with the second user profile, instructing the second client to activate a client executed voice detection component.

15. The non-transitory computer storage media of claim 12, wherein the first audio data chunk has a duration less than or equal to 60 seconds.

16. The non-transitory computer storage media of claim 12, wherein the first audio session is compiled responsive to detecting termination of the multi-user session.

17. The non-transitory computer storage media of claim 12, wherein the stream of audio data is cleared responsive to compiling the first client audio session.

18. The non-transitory computer storage media of claim 12, wherein the first stream of audio data is analyzed based on data associated with the first user profile.

19. A method comprising:
- initiating a multi-user session including a voice communication channel for a plurality of client, wherein the initiating includes identifying a first user profile associated with a first client;
- receiving a first stream of audio data transmitted from the first client via the voice communication channel;
- based on data associated with the first user profile, analyzing the first stream of audio data to tag a plurality of portions of the first stream of audio data including spoken audio;
- stitching together in sequence the plurality of tagged portions of the first stream of audio data into a first audio data chunk based on metadata included in the tags, the first audio data chunk having a duration less than or equal to 60 seconds;
- detecting termination of the multi-user session;
- responsive to detecting termination of the multi-user session, reconstructing a first client audio session by combining a first set of audio data chunks in sequence; and
- responsive to compiling the first client audio session, clearing the stream of audio data transmitted from the first client.

* * * * *